United States Patent [19]

Balboni et al.

[11] 4,447,459
[45] May 8, 1984

[54] PREPARATION OF PAR-FRIED POTATO PIECES

[76] Inventors: John J. Balboni, Nash Rd., Purdys, N.Y. 10578; Leon Hong, 29 Cottage Ct., Freeport, N.Y. 11520

[21] Appl. No.: 475,523

[22] Filed: Mar. 15, 1983

[51] Int. Cl.³ .............................................. A23L 1/216
[52] U.S. Cl. .................................. 426/441; 426/438; 426/637; 426/808
[58] Field of Search ............... 426/144, 637, 438, 441, 426/444, 456, 465, 472, 473, 482, 483, 518, 808

[56] References Cited

U.S. PATENT DOCUMENTS 3,391,005  7/1968  Babigan ........................... 426/637 X
3,881,028  4/1975  Capossela et al. .............. 426/637 X
4,256,777  3/1981  Weaver et al. ...................... 426/637

*Primary Examiner*—Arthur L. Corbin
*Attorney, Agent, or Firm*—Thaddius J. Carvis

[57] ABSTRACT

The objects of the invention are to enable the preparation of fried potato products which retain their crispy texture for extended periods of time and to prepare fried potato products with improved color control.

Potato pieces, such as strip-shaped french fries or disc-shaped dinner fries, remain crisp longer after finish frying if the surface skin, which is formed during par-frying, is disrupted prior to finish frying. The surface of the potato pieces can be disrupted in any manner, either prior to or after freezing. To better control the color of the finish-fried potato pieces, the potato pieces can be quenched in cold salt water after blanching or blanched in salt water.

18 Claims, 10 Drawing Figures

PREPARATION OF PAR-FRIED POTATO PIECES

TECHNICAL FIELD

The present invention relates to fried potatoes, and particularly to improved processing which produces fried potatoes which retain their crispness for extended periods and have improved color.

Potatoes have long been a staple in the diets of most Western countries. Among the many popular ways in which potatoes are served are the various fat-fried forms. Typical among these are french fries, which are typically elongated, generally-square strips of potatoes, and dinner fries, which are typically flat sections such as sliced perpendicular to the long axis of the potato. These products, as well as other types of fried potato pieces, have become increasingly popular in recent years. Advances in potato processing technology have enabled the mass marketing of frozen products which can be easily prepared into fresh-tasting products at home or in restaurants. Unfortunately, these fried potatoes typically lose their crispness within minutes of frying—often requiring that they be discarded prior to consumption so as not to displease diners who associate crispness with quality. Color is also associated with quality and is difficult to control.

There is a present need for processing improvements which would enable retention of crispness for longer periods of time and improve control of color. It would be most advantageous if these improvements could be achieved with decreased energy consumption and a savings in time and materials such as cooking oil.

BACKGROUND ART

U.S. Pat. No. 3,397,993 to Strong is directed to a process for preparing frozen french fried potato segments which is said to enable the preparation of a final product, after a short finish fry, that closely simulates french fried potatoes prepared from fresh potatoes. According to the disclosure, potatoes are initially peeled, trimmed, cut into segments and washed. The individual segments are then blanched in hot water or steam until they become translucent. The blanched potato segments are then dehydrated for a product weight loss of about 20 to about 30% of their initial weight, immersed in a deep-fat fryer for from about 15 to about 60 seconds and are then frozen.

Strong indicates that, even after long periods of storage, the frozen potato segments can be finish fried rapidly to produce french fried potato strips of high quality, substantially identical to french fries produced from raw, unfrozen potatoes. Unfortunately, it has been our experience that french fried potatoes, whether prepared in the manner suggested by Strong, or from raw, unfrozen potatoes, lose their desired crispness after a relatively short period of time and become undesirably soggy.

During peak periods in high-volume fast-food restaurants, crispness retention can be controlled adequately by good management of the rate at which the french fries are finally fried. However, the best management plan requires close supervision and, even then, is susceptible to breakdown. Moreover, during periods of less than peak demand, the internal moisture within the previously fried fries is given sufficient time to migrate into the crisp outer surface of the fries to render them soggy. Thus, the restaurateurs desire to meet immediate demands for crisp french fries must be tempered by the practical consideration of unacceptably high levels of products which must be discarded. And, diners who choose to take out their orders often end up with french fries which have lost their crispness.

Wilder, in U.S. Pat. No. 3,649,305 also discloses a process which is said to enable the preparation of frozen french fried potatoes which, when finish fried by the final user or retailer, will closely simulate french fried potatoes prepared from fresh potatoes in color, texture, flavor and odor. According to the disclosure, the potatoes are first peeled, trimmed, cut into french fry size strips and washed. The strips are then immersed in a water solution containing a commercially acceptable discoloration-inhibitor, dehydrated without prior blanching to reduce the weight by from about 10 to about 30%, and then blanched. After blanching, the strips are then par-fried and frozen. While improvement in color retention is asserted, there is no indication that the product produced by Wilder retains its crispness any longer than french fried potatoes prepared from freshly-cut, raw potatoes.

Canadian Pat. No. 900,266 to Saunders discloses a process which is again said to result in a finally fried product which simulates in color, quality, texture, flavor and taste, french fried potatoes prepared directly from fresh potatoes. Saunders discloses the conventional preliminary steps, including sugar adjustment, for color control. Thereafter the strips are partially fried to reduce the weight of the strips by about 20% prior to a dehydration step which results in a further weight reduction of from about 5 to about 20%. Following dehydration, the potato strips are subjected to a second frying step and frozen. Again, no improvement in crispness retention is disclosed.

The problem of retaining crispiness is addressed in U.S. Pat. No. 3,391,005 to Babigan and U.S. Pat. No. 4,254,153 to Ross et al. According to Babigan, a raw potato is cut into elongated strips having a plurality of thin parallel ribs of defined dimensions. These ribs enable the formation of a thicker, crisper crust by virtue of their shape. While Babigan discloses that the product can be frozen, there is no specific disclosure with regard to processing necessary to prepare a high quality product from his cut potato strips.

Ross et al., in U.S. Pat. No. 4,254,153, discloses a process for preparing frozen par-fried potatoes which, when finish fried, are said to have a mealy internal core surrounded by a crisp surface which remains crisp and rigid for extended periods of time after frying. According to the disclosure, potatoes which have been peeled, trimmed, cut into strips and blanched, are subjected to a two-stage drying procedure. The first drying stage exposes the strips to high velocity ambient air to reduce their weight by about 8 to 15%. The second drying stage subjects the pieces to circulating heated air to further reduce the weight of the strips by an additional 8 to 15%. After drying, potato strips are then maintained in a quiescent state for a short period of time to permit equalization of the moisture distribution in the strips and are then par fried and frozen. According to Example 1, the two-stage drying procedure takes a total of about 27 minutes, thus greatly increasing processing time from that which is conventional.

In U.S. Pat. No. 3,881,028 to Capossela Jr. et al., there is disclosed a process for preparing a rehydratable deep-fat fried potato product. According to this disclosure, potato pieces are preliminarily processed in conventional fashion and then heated by microwave energy to partially gelatinize the starch therein prior to deep-fat frying and heating to effect dehydration. The treated pieces are said to be shelf-stable without refrigeration and can be rehydrated by soaking in water and heating. Capossela Jr. et al. disclose that it is possible to provide a crispier shell on the product if, after blanching and quenching in cold water, the potato pieces are soaked in a sodium chloride solution heated to about 180° F., followed by washing again with cold water. There is no indication given by Capossela as to the effect of this cold-water-quenching/hot-salt-water-soaking/cold-water-quenching on product color. In any event, the teachings are not directed to a frozen, par-fried potato product and inherently produce a product which is less crisp than even products prepared from freshly-cut raw potatoes.

In U.S. Pat. No. 3,934,046 to Weaver et al., a process is disclosed which is said to enhance texture, maintain flavor, and prevent darkening of fried potato products. As part of their disclosure, Weaver et al. indicate that leaching raw potato pieces with hot water prior to frying has several disadvantages, including serious impairment of texture and flavor. According to their disclosed process, preliminarily prepared raw potato pieces are pre-fried first and then leached by contact with water. Weaver et al disclose that, following the application of these critical steps, the treated pieces may be subjected to any of various procedures, depending upon the final product desired. For preparing french fried potatoes, the examples indicate that the potato strips are frozen for later finish frying or are further fried prior to freezing for final preparation by oven baking.

There is a present need for simple and effective process improvements which would enable the preparation of par-fried, frozen potato products which, upon final frying, would retain their crisp outer texture for extended periods of time with improved color control and efficient use of processing time, energy expenditure and cooking oil.

Disclosure of Invention

In accordance with the present invention, there are provided improved processes for preparing par-fried potato products and improved par-fried potato products.

According to one embodiment of the present invention, a process for preparing par-fried potato pieces comprises: cutting a potato into pieces, par-frying the potato pieces in hot oil under conditions effective to form a skin over the cut surfaces of the potato, and disrupting the outer surface of the potato pieces. According to another aspect of the invention, the potato pieces are frozen either before or after disrupting the outer surface of the potato pieces.

According to yet another aspect of the invention, a process is provided for improving the crispness of fried potato pieces prepared from potato pieces which have been heated sufficiently to inactivate enzyme activity and partially dehydrate the pieces, par-fried sufficiently to form a surface skin and frozen, the process comprising: disrupting the surface after par-frying, but prior to finish frying.

Also provided according to the present invention is a frozen, par-fried potato product comprising discrete pieces of potato having a surface skin resulting from frying substantially completely covering the surfaces of the potato pieces but which has been disrupted to expose the interior of the potato pieces.

According to another aspect of the invention, a process is provided for improving color control in the preparation of frozen, par-fried potato pieces, comprising: cutting a potato into pieces, heating the potato pieces sufficiently to destroy enzyme activity, quenching the potato pieces in brine under conditions effective to withdraw potato sugar from and cause migration of salt into the interior of the potato pieces, washing the potato pieces in water under conditions effective to withdraw salt and additional potato sugar from the potato pieces, partially drying the potato pieces, par frying the potato pieces, and freezing the potato pieces.

BRIEF DESCRIPTION OF THE DRAWINGS

The present invention will be better understood and its advantages will become more apparent from the following detailed description, especially when read in light of the attached drawings wherein:

FIGS. 1, 3, and 4 show french fry-type pieces and FIGS. 6, 8, and 9 show dinner fry-type pieces;

DETAILED DESCRIPTION OF THE INVENTION

Figure 1:
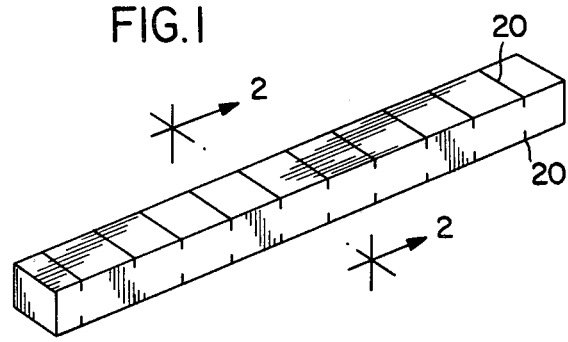
FIGS. 1, 3, 4, 6, 8 and 9 are perspective views of various embodiments of the present invention showing different shapes and configurations in which the surface of the potato pieces can be disrupted.
Figure 2:
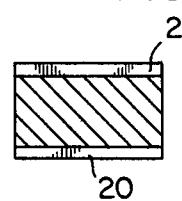
FIG. 2 is a cross-sectional view taken along line 2—2 in FIG. 1.

The present invention can improve the crispness of fried potatoes prepared from white potatoes of any variety. The preferred types of potatoes are those which are commonly used for french fries. The essential feature of the invention is that they be first par-fried to develop a skin on the exterior and then scored, cut, punctured, or otherwise treated to disrupt the surface skin formed during par frying to open it to expose the mealy interior. The treatment to disrupt surface can be carried out prior to freezing or on a product not intended for freezing, or it can be accomplished after freezing either prior to packaging or immediately prior to finish frying. It is an advantage of the present invention that commercially-available frozen, par-fried french fries can be processed according to the present invention to improve their crispness retention.

The drawings illustrate a number of the many different configurations which the products of this invention can be given by virtue of the surface-disruption step. FIGS. 1-5 show variations of the typical strip-type french fry which is typically cut in long strips to a dimension of from about 3/16 to about ½ inch on a side. FIGS. 6-10 indicate a typical dinner fry potato which can be a cross-sectional slice cut along the axis of the potato to a thickness of from about 3/16 to about ⅜ inch. The particular dimensions or shape of the final product are not important. What is important is that the potato pieces are first par-fried sufficiently to form a surface skin in conventional fashion and then the surface skin is disrupted prior to finish frying. It is preferable that the potatoes also be subjected to conventional blanching and dehydration procedure for their known benefits. Also, if desired, the color of the french fries can be improved according to the color-improvement aspect of this invention.

French fries prepared in conventional fashion with the surface skin, formed during par-frying, remaining fully intact tend to quite rapidly lose their crispness after finish frying. Typically, such conventional fried potato products have lost all noticeable crunch, except possibly at over-fried edges or corners, even prior to completion of a meal. Second servings from the original batch are almost always limp and rubbery. This is believed to be due to the natural tendency of the hot, moist, mealy interior of the potato to cause migration of moisture toward the surface skin. The potato products of the present invention, however, remain crisp and noticeably crunchy for extended periods of time, even after being cooled to essentially room temperature.

The finish frying of par-fried potato pieces has a number of effects on the potato. In addition to developing the typical fried potato color and the crispy exterior it also further dehydrates the potato pieces. The dehydration during the preparation of conventional french fries is effected by heating the internal moisture of the potato pieces to create moisture vapor and forcing it through the surface skin formed during par frying. It is believed that the exhaustion of moisture through the surface skin is retarded by the skin to such an extent that an excess amount of water remains within the potato pieces upon removal from the fryer and this moisture continues to push through the surface skin even after frying.

The bulk flow of moisture through the surface skin during finish frying is believed to establish pathways through the mealy interior of the fry and through the surface skin itself. This would have a number of adverse effects on texture. First, it is believed that the constant passage of moisture through the surface skin during finish frying prevents the skin from achieving the degree of crispness that it would otherwise have if moisture were not forced therethrough. Secondly, it is believed that the pathways provide the path of least resistance for escaping moisture or simply moisture migration subsequent to frying. Thirdly, it is believed that forcing moisture through the skin in this manner retards dehydration to an extent that frying times are prolonged and final moisture contents remain higher than necessary for optimum internal texture.

According to the present invention, however, the surface skin formed during par frying is disrupted prior to finish frying. It is believed that by disrupting the surface, moisture vapor generated during finish frying is channeled, not through the exterior skin, but directly through the areas of surface disruption. Thus, the surface skin which is being finish fried is not constantly subjected to the passage of moisture vapor therethrough and the pathways for escape of moisture are not fixed in the direction of the surface skin such that moisture would continue to migrate toward the skin even after completion of the finish frying. Additionally, it is believed that the provision of disruptions in the surface skin of the potato pieces provides a better relief valve for built-up pressure to more completely release water vapor generated during finish frying and to leave behind a minimum of moisture.

While it is apparent that the areas of surface disruption develops a surface skin during finish frying, it is our belief that this skin never becomes as solid and impenetrable as the original surface skin. Upon initially placing the product of the invention in hot oil for finish frying, the surface skin formed during par-frying is relatively impervious to moisture as compared to the areas of surface disruption. This permits this original surface skin to fry to a more impervious structure while moisture is forced through the areas of surface disruption. Even as the skin forms over these areas, moisture continues to flow therethrough in large quantities. This bulk flow of moisture prevents a totally impervious skin to be formed at these areas and accommodates the formation of a crisper, less-pervious skin over the other areas of the potato piece.

Applicants offer these statements by way of a possible explanation for the unexpectedly good results achieved according to the present invention, but do not wish to be bound to this particular theory as there may be other factors influencing the result which may contribute to or produce even greater influence in the achievement of the results. Whatever the reason for the improvements, it remains that the products of the present invention do remain crisp for greater periods of time than products prepared otherwise.

The initial steps in processing the potato can be accomplished in conventional fashion. Thus, potatoes are washed and peeled using conventional methods and then cut into strips, discs or other shapes as is desired. The cut potato pieces may then be washed to remove surface starch and/or treated for color control as is conventional in the art. The steps of peeling and washing the cut pieces are optional. Preferably, the color control techniques of the present invention are also employed.

The color control procedure of the present invention has the advantage that it can be combined with the conventional blanching procedures known to the art to enhance color control. For example, according to one aspect of the color control process of the present invention, the potatoes can be blanched for conventional periods of time in brine. Typically the brine is prepared by simply adding salt at a concentration of from about 0.1 to about 10% to the aqueous blanching liquid.

According to another embodiment of color control according to the present invention, the hot potato pieces resulting from blanching in plain water can be quenched in cold brine under conditions of time, temperature and salt concentration effective to draw potato sugar from the potato pieces and to cause migration of salt into the interior of the potato pieces. Both the sugar withdrawal and the salt migration are achieved due to the combined effects of osmotic pressure and temperature differential between the potato pieces and the brine. The blanched potato pieces will be hot and the brine will preferably be at a temperature of from about 40° to about 80° F. After quenching in the brine, the potato pieces are then washed in cool water under conditions effective to withdraw salt and further potato sugar from the potato pieces. The washing following the quenching in the brine employs the salt for what might be likened to an osmotic pumping action, causing salt to be withdrawn from the potato and carrying with it additional sugars.

While these aspects of color control according to the present invention can be employed with improved results, it is also possible to employ other color control methods, such as leaching in plain tap water or preconditioning raw potatoes by holding them at room temperature for a period of from about 1 week to several months. This latter tempering procedure reduces the natural sugar content of the potatoes by natural enzymatic action. In some cases no color control step is required.

The potato pieces are preferably heated sufficiently to destroy enzyme activity (i.e., blanched) and to partially dehydrate the potato pieces. This can be conducted in one or more steps. Typically, the blanching and dehydration steps are conducted separately, and the dehydration can be accomplished in a plurality of stages. When prepared for immediate use, neither blanching nor partial dehydration steps would be necessary.

When conducted separately, blanching is typically carried out by heating in steam or in hot water for from about 2 to about 10 minutes. The blanching operation should be conducted to an extent sufficient to inactivate the enzymes throughout the potato pieces to prevent degradation during frozen storage but should not be so extensive as to cause sloughing of solids from the cut surfaces. When blanched in water, the water temperature will vary from about 180° F. to about boiling, however, this temperature is not critical and any temperature effective for the purpose can be employed.

The blanched potato pieces are then typically air dried in one or a plurality of stages. Typically, the drying air will be at a temperature of from about 125° to about 200° F. The temperature of the air, its relative humidity, and its rate of flow past the potato pieces will be controlled in known manner to achieve rapid drying without prematurely creating a tough skin on the potato pieces. Such a skin tends to decrease the rate of drying and results in excessive chewiness in the finished product. The weight loss during the dehydration step can amount to up to about 35% of the original weight of the potato pieces, but will preferably be controlled to within the range of from about 5 to about 20%. Most preferably, the air drying will conducted at a temperature of from about 170° to about 180° F. for a time sufficient to achieve a weight loss of about 15%.

Following dehydration, the potato pieces are then par-fried in hot oil under conditions effective to form a skin over the cut surfaces of the potato. If desired, this par-frying step can also be employed to achieve a moderate degree of dehydration, although this is not the preferred manner of operation. The par-frying will typically be conducted for a period of time of from about 30 seconds to about 3 minutes at a temperature within the range of from about 325° to about 400° F. Preferably, the par-frying will be conducted at a temperature of from about 340° to about 365° F. for from about 45 seconds to about 1½ minutes.

After par-frying, the potato pieces are then processed in any suitable manner to disrupt the surface skin that was formed during par-frying. This can be accomplished, for example, by cutting with a blade, puncturing with needle-like projections, abrading lightly with a coarse abrasive surface, or simply removing the potato peel, which could be intentionally left on a portion of the potato pieces, such as sliced dinner fries, through par-frying.

The exact degree of surface disruption necessary to achieve the advantages of the present invention cannot be quantified by any universally exact numerical description. However, guided by the specific examples of the invention set forth in the drawings and in the specific operating examples set forth below, it can be seen that a wide variety of degrees and types of scoring can be employed to achieve the objects of the invention. For french fried potatoes of the type shown in FIG. 1 and dinner fry potatoes of the type shown in FIG. 6, the surface is slit with a knife means just sufficiently to fully penetrate the surface skin. These surface slits are shown as parallel cuts 20 which are preferably spaced from about ⅛ inch to about ½ inch apart.

Figure 3:
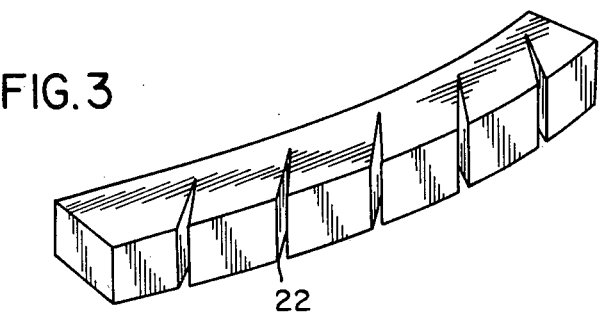
Figure 4:
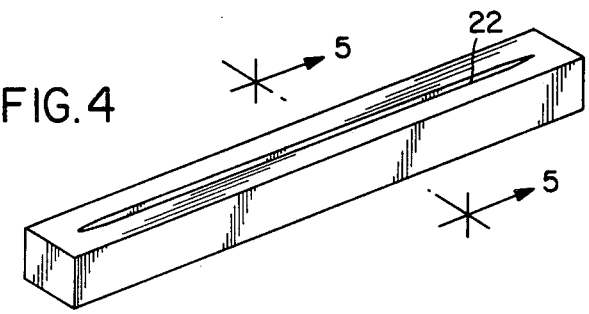
Figure 5:
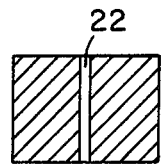
FIG. 5 is a cross-sectional view taken along line 5—5 in FIG. 4.
Figure 6:
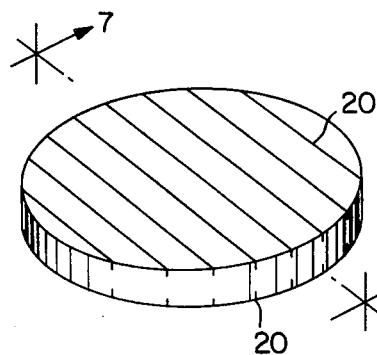
Figure 7:
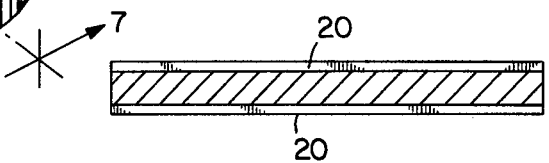
FIG. 7 is a cross-sectional view taken along line 7—7 in FIG. 6.
Figure 8:
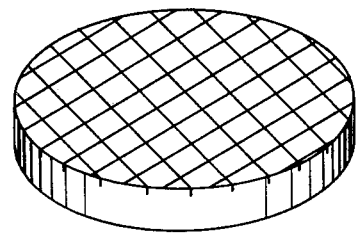
Figure 9:
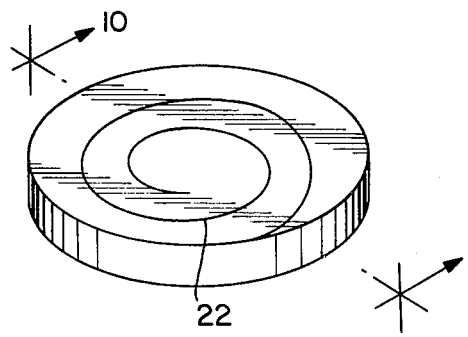
Figure 10:
FIG. 10 is a cross-sectional view taken along line 10—10 in FIG. 9.

The embodiments of FIGS. 3–5 show the surface disruption of french fries by placing cuts 22 through the full thickness of the fries at various locations. In addition to disrupting the surface of the par-fried potato pieces to achieve the advantages of the present invention, the cuts made in this manner further add an additional dimension of crispness by providing thinner areas at discrete locations which are fried to achieve a greater ratio of crispy skin to soft, mealy interior. While this does provide an added degree of crispness to the product, the advantage of the present invention does not depend upon these thinned, crisp areas.

It is an advantage of the present invention that the surface disruption can provide attractive designs in the final product. These designs can be due to the shape of the fry after cutting into particular configurations as shown in the drawings. The fried product can also be given attractive surface designs by cutting or piercing the potato in desired patterns along the surface skin. For example, the disc-shaped, dinner fry product is especially adaptable to having a trademark logo or other design imprinted in the surface by passing the potato pieces into contact with a roller having cutting means placed in a desired configuration. In addition, the potato pieces can be cut into any desired overall shape, such as in the form of alphabet letters, numbers, or common shapes such as animals or the like.

It is possible to perform the surface disruption step at any point in processing after par-frying and prior to finish frying. Conveniently, it can be conducted immediately after par-frying and prior to freezing, however the order of these steps can be reversed and intermediate processing steps such as partial chilling can be employed where desired to firm the texture of the potato pieces after par-frying but prior to surface disruption.

The potato pieces can be frozen and packaged in conventional manner to permit storage for extended periods of time.

Because the advantages of the present invention are achieved independent of the sequence of the surface disruption and freezing steps, it is possible for a cook to score or otherwise disrupt the surface of conventionally-prepared frozen, par-fried potato pieces directly prior to finish frying.

Finish frying of the potato pieces can be conducted in conventional fashion, such as frying in fat or oil at a temperature within the range of from about 325° to about 400° F. Frying times according to the present invention will be within the range of from about 1 minute to about 5 minutes. It is an advantage of the present invention that frying time can be decreased significantly from that which is conventional, due to the rapid release of moisture from the interior of the potato through the areas of surface disruption. Preferred frying conditions will be with an oil temperature of from about 340° to about 365° F. for from about 1 minute and 15 seconds to about 3½ minutes. The frying time will of course vary with the shape of the product, its moisture content and temperature upon submersion into the hot oil.

The more rapid finish frying enabled according to the present invention provides savings in labor, energy and useable product. Because the invention reduces the finish frying time to such a short period, the necessary inventory of finish-fried fries at any given time can be reduced. Moreover, because the fries remain crisp for extended periods of time, they remain suitable for serving longer, thus virtually eliminating wastage of product and providing a product more desirable for takeout orders where the time between purchase and consumption will vary. Additionally, because the rapid finish frying enabled according to the present invention permits the production of greater amounts of potatoes to be fried in a given time, energy and equipment savings are realized.

Best Mode for Carrying Out the Present Invention

The following examples are provided to illustrate and explain the present invention in terms of the best modes for carrying it out. These examples are not intended to be limiting in any regard. Unless otherwise indicated, all parts and percentages are based upon the weight of the raw potato prior to frying.

EXAMPLE 1

This example illustrates the utilization of the present invention to prepare a shoestring potato employing both the color control and crispness-improving embodiments of the invention.

Idaho potatoes are washed, peeled and cut into strips ⅜ inch by ⅜ inch by conventional methods. The potato strips are then blanched for 8 minutes at 200° to 205° F. in brine, having a salt concentration of about 2%. The blanched potato pieces are removed from the blanching solution and air dried at about 175° F. for about 10 minutes to achieve a weight loss of about 15%. The potato pieces are then par-fried in hot oil at a temperature of about 350° F. for 1 minute, during which period of time a surface skin is formed over the cut surfaces of the potato piece. The potato pieces are then scored on two opposed surfaces by slicing with a knife just through the surface skin in parallel cuts spaced about ⅜" apart. The potato pieces are then frozen. For final preparation, the frozen french fries are finish fried in oil at a temperature of about 350° C. for 1 minute and 15 seconds.

The resulting french fries remain crisp even after cooling for more than 30 minutes to essentially room temperature. This crispness has been objectively noted by an audible crunchy sound upon chewing. In addition to the retained crispiness, the salt blanching controls the color to an even, light, fried color and provides a desirable level of saltiness which may eliminate the need for further salting.

EXAMPLE 2

The process of Example 1 is repeated except that the sequence of freezing and surface disruption is reversed. The products produced according to this example are essentially the same as those of Example 1.

EXAMPLE 3

The process of Example 1 is substantially repeated, with the only exception being that the blanching water is tap water not containing added salt. The texture of the resulting finish fried product is essentially the same as that of Example 1, but the color is somewhat darker.

EXAMPLE 4

This example further illustrates both the color control and crispness improvement of the present invention for preparing a french fried potato product.

According to this example, potatoes are washed, peeled and cut as in Example 1, blanched for 8 minutes in tap water at a temperature of 200° to 205° F., quenched in brine having a salt concentration of about 5% and a temperature of about 75° F. for 10 minutes, and rinsed in cold tap water for 15 minutes. The potato pieces are then processed by par-frying, scoring, freezing and finish frying as set forth in Example 1. The resulting products are similar in texture and crispness retention to those in Example 1.

EXAMPLE 5

This example illustrates the preparation of home-fried style potatoes with improved crispness retention according to the present invention.

The potato pieces are washed, peeled and cut into slices ⅜" thick. The potato slices are blanched for 10 minutes in water at a temperature of 200° to 205° F. The blanched potato pieces are then air dried at 175° F. for about 10 minutes to achieve a weight loss of 15%. The resulting partially-dehydrated potato pieces are then par-fried at 350° F. for 1½ minutes. The par-fried potato pieces are then scored with a knife on opposed flat surfaces by two intersecting series of parallel cuts just through the surface skin developed by par-frying, the cuts being spaced about ⅜" apart. The scored potato pieces are frozen and held for finish frying at a temperature of 350° F. for 3 minutes. The resulting dinner-fry potatoes have an unusually desirable combination of crispy surface and mealy interior, and retain this textural contrast to a significant extent even after cooling to room temperature.

EXAMPLE 6

This example repeats the procedure of Example 5, except that the potatoes are not peeled prior to cutting and instead of scoring the surface after par-frying, the necessary surface disruption is obtained by simply removing the skin from the peripheral edges of the potato slices. The products produced in this manner are similar in all respects to those produced according to Example 5.

EXAMPLE 7

For purposes of illustrating the improvement in crispness retention which can be achieved according to the present invention, a comparison is made of the invention to the prior art by using commercially-available frozen par fried french fried potatoes as the starting materials.

These french fried potatoes were elongated strips, having an essentially square cross-section about ⅜" on a side and had a noticeable surface skin thereon, resulting from the par-frying step employed in their preparation. One portion of these potatoes was scored with a knife along two opposed surfaces of each potato piece just sufficiently to break the surface in parallel cuts spaced about ⅜" apart. This portion of fries and another portion from the same bag were combined and then immersed in a hot oil bath maintained at a temperature of 350° F. for 2 minutes. The resulting finish-fried potatoes were drained on paper toweling where they were left to stand for about 30 minutes.

The two portions of potatoes were distinguishable in appearance due to a slight darkening in the areas of the scoring. The unscored potato pieces were limp and rubbery, whereas those which had been scored after par-frying but prior to finish frying, in accordance with the present invention, retained a noticeable, crispy exterior apparent by an audible crunch upon biting.

The above description is presented for the purpose of teaching the person of ordinary skill in the art how to practice the present invention. It is not intended to describe in detail all of the obvious modifications and variations of the invention which would become apparent to the person of ordinary skill in the art upon reading. It is intended, however, to include all such modifications and variation within the scope of the invention which is defined by the following claims.

We claim:

1. A process for preparing par-fried potato pieces comprising: cutting a potato to form pieces par-frying the potato pieces in hot oil under conditions effective to form a skin over the outer surfaces of the potato pieces, and then disrupting the outer surface skin of the potato pieces to expose the interior of the potato pieces.

2. A process according to claim 1 wherein, prior to par-frying, the potato pieces are blanched in aqueous liquid or steam to destroy enzyme activity, and then dried sufficiently to reduce the weight of the potato pieces by an amount of from about 5 to about 20% of the original weight, and frozen for storage after par-frying.

3. A process according to claim 2 wherein the potato pieces are blanched in brine.

4. A process according to claim 2 wherein, after blanching and prior to par-frying, the potato pieces are quenched in brine for a time effective to withdraw a portion of the potato sugars and to cause migration of salt into the potato pieces, and the brine-quenched potato pieces are then washed with water under conditions effective to withdraw salt and additional potato sugar from the potato pieces.

5. A process according to claim 1 wherein the potato is peeled prior to cutting.

6. A process according to claim 1 wherein the potato is cut into pieces with the natural skin essentially intact.

7. A process according to claim 6 wherein the step of disrupting the outer surface skin of the potato pieces comprises removing the natural skin from the par-fried potato pieces.

8. A process according to claim 1 wherein the step of disrupting the outer surface skin of the potato pieces comprises puncturing the surface skin at a plurality of discrete locations.

9. A process according to claim 1 wherein the step of disrupting the outer surface skin of the potato pieces comprises cutting the surface skin at a plurality of discrete locations.

10. A process according to claim 1 wherein the step of disrupting the outer surface skin of the potato pieces comprises slitting the surface skin.

11. A process according to claim 1 wherein the potato is cut into cross-sectional slices having a thickness of from about 3/16 to about ½ inch.

12. A process for preparing frozen, par-fried potato pieces comprising: cutting a potato into pieces, heating the potato pieces sufficiently to destroy enzyme activity and to partially dehydrate the potato pieces, par-frying the heated potato pieces in hot oil under conditions effective to form a skin over the outer surfaces of the potato pieces, freezing the par-fried potato pieces and disrupting the outer surface skin of the potato pieces, after par-frying, to expose the interior of the potato pieces.

13. A process according to claim 12 wherein, prior to par-frying, the potato pieces are blanched in aqueous liquid or steam to destroy enzyme activity and then dried sufficiently to reduce the weight of the potato pieces by an amount of from about 5 to about 20% of the original weight.

14. A process according to claim 12 wherein, after blanching and prior to par-frying, the potato pieces are quenched in brine for a time effective to withdraw a portion of the potato sugars and to cause migration of salt into the potato pieces, and the brine-quenched potato pieces are then washed with water under conditions effective to withdraw salt and additional potato sugar from the potato pieces.

15. A process for improving the crispness of fried potato pieces prepared from potato pieces which have been heated sufficiently to inactivate enzyme activity and partially dehydrate the pieces, par-fried sufficiently to form an outer surface skin, frozen, and then finish fried, the improvement comprising:

disrupting the outer surface skin, after par-frying but prior to finish frying, to expose the interior of the potato pieces.

16. A process according to claim 15 wherein the surface skin is disrupted prior to freezing.

17. A process according to claim 15 wherein the surface skin is disrupted after freezing.

18. A process according to claim 15 wherein the potato pieces have been heated sufficiently to reduce the moisture content in an amount of from about 5 to about 20% of the original weight of the pieces.

* * * * *